United States Patent
Winter et al.

(10) Patent No.: US 6,426,822 B1
(45) Date of Patent: *Jul. 30, 2002

(54) METHOD AND APPARATUS FOR REDUCING NON-LINEAR CHARACTERISTICS OF A SIGNAL MODULATOR BY COHERENT DATA COLLECTION

(75) Inventors: Gary Edwin Winter; Thomas Edward Cooney, both of Carlsbad, CA (US)

(73) Assignee: IPICOM, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/104,916

(22) Filed: Jun. 25, 1998

(51) Int. Cl.[7] .............................................. H04B 10/04
(52) U.S. Cl. ....................... 359/187; 359/161; 359/180; 359/181; 359/245; 375/295; 375/355; 455/114; 455/126; 455/127
(58) Field of Search ................................ 359/161, 187, 359/180, 181, 245; 375/295, 355; 455/114, 126, 127

(56) References Cited

U.S. PATENT DOCUMENTS

| | | | | |
|---|---|---|---|---|
| 5,003,624 A | * | 3/1991 | Terbrack et al. ............ 455/618 |
| 5,161,044 A | * | 11/1992 | Nazarathy et al. ........... 359/157 |
| 5,321,543 A | * | 6/1994 | Huber ......................... 359/187 |
| 5,327,279 A | * | 7/1994 | Farina et al. ................ 359/180 |
| 5,343,324 A | * | 8/1994 | Le et al. ...................... 359/184 |
| 5,400,417 A | * | 3/1995 | Allie et al. ...................... 385/2 |
| 5,495,359 A | * | 2/1996 | Gertel et al. ................. 359/245 |
| 5,532,867 A | * | 7/1996 | Hayes et al. ................. 359/329 |
| 5,600,472 A | * | 2/1997 | Uesaka ......................... 359/161 |
| 5,646,771 A | * | 7/1997 | Noda ........................... 359/245 |
| 5,764,551 A | * | 6/1998 | McCorkle .............. 364/24.001 |
| 5,812,297 A | * | 9/1998 | Mussino et al. ............. 359/181 |
| 5,850,305 A | * | 12/1998 | Pidgeon ....................... 359/187 |
| 6,014,241 A | * | 1/2000 | Winter et al. ................ 359/245 |
| 6,046,838 A | * | 4/2000 | Kou et al. ................... 359/245 |
| 6,163,395 A | * | 12/2000 | Nemecek et al. ............ 359/817 |

* cited by examiner

Primary Examiner—Leslie Pascal
Assistant Examiner—Hanh Phan
(74) Attorney, Agent, or Firm—Brown, Martin, Haller & McClain, LLP

(57) ABSTRACT

A pilot signal is generated and injected into the input (108) of a signal modulator (104). The harmonic signal of a pilot signal produced at the output (110) and due to the non-linear transfer function of the signal modulator (104) is coherently sampled in the time domain to produce a plurality of digital samples. The digital samples are averaged to produce an average harmonic signal value. The bias voltage at which the signal modulator (104) is biased is adjusted to minimize the magnitude of the average harmonic signal value.

26 Claims, 4 Drawing Sheets

METHOD AND APPARATUS FOR REDUCING NON-LINEAR CHARACTERISTICS OF A SIGNAL MODULATOR BY COHERENT DATA COLLECTION

CROSS-REFERENCES TO RELATED APPLICATIONS

This application is related to the following U.S. Pat. application, incorporated by reference herein:

Winter et al., U.S. patent application, Ser. No.09/104,639 now U.S. Pat. No. 6,014,241, filed Jun. 25, 1998 concurrently herewith, entitled "Method and Apparatus for Reducing Non-Linear Characteristics of a Signal Modulator by Cross-Correlation", docket number 3857-PA47.

BACKGROUND OF THE INVENTION

1. Field of the Invention

The present invention relates in general to signal modulators and specifically to a method and apparatus for maintaining linear operation of a signal modulator using coherent data collection.

2. Description of the Related Art

Communication systems use transmitters having signal modulators that modulate a desired signal onto a carrier signal before transmission. Optical communication systems typically employ high power optical transmitters. For example, cable television broadcast networks use high power optical transmitters to transport multiple video channels through fiber optics for signal distribution. These transmitters typically utilize electro-optic intensity modulators to modulate an optical signal before transmission.

Electro-optic modulators are constructed by placing metal electrodes above and below an optical waveguide formed in a crystal. Lithium niobate (LiNbO3) is typically used for the crystal. A desired signal is modulated onto these electrodes, and the electric field between the electrodes, in turn, modulates the crystal, changing its optical index of refraction in response to the input signal. As the refractive index changes, the light (typically from a continuous wave (CW) source laser) is modulated as it passes through the external modulator.

External modulators have a sinusoidal transfer function of modulation voltage input (across the electrodes) in relation to light modulation output. Proper operation of the modulator requires that a direct current (D.C.) bias voltage be applied across the electrodes of the modulator, and that the bias point must be maintained at the point of inflection in the sinusoidal transfer function, called the quadrature bias point.

However, the quadrature bias point is subject to drift due to temperature and to charges accumulated in the optical crystal over time. As the D.C. bias moves away from the quadrature bias point, the modulation transfer function causes significant second order intermodulation distortion in the transmitted signal. Therefore, for proper system operation, the bias point must be maintained at the quadrature point.

One attempt at maintaining the proper bias point includes injecting a radio frequency (RF) pilot tone (also referred to as a continuous wave (CW) pilot signal) into the modulator in addition to the modulation signals. A portion of the optical output from the external modulator is detected by an optical receiver. A harmonic signal of the injected pilot tone is monitored at the output of the receiver. The amplitude of the harmonic signal is a function of the difference between the quadrature point on the modulator's transfer function, and the actual D.C. bias point. When biased exactly at quadrature, the amplitude of the harmonic signal is suppressed. By monitoring the harmonic signal of the pilot tone, a feedback loop adjusts the bias voltage in order to maintain quadrature bias.

However, current approaches to implementing this bias control loop are unreliable. The dynamic range of the magnitude of the harmonic signal can exceed 100 dB. Since current approaches use an analog feedback loop, accurate detection of the harmonic signal is lacking. As the quadrature bias point is reached, the harmonic signal amplitude drops below the noise floor of the system. As a result, the loop can not maintain the bias point.

Therefore there exists a need for a method and apparatus for maintaining the optimum bias point of a signal modulator.

SUMMARY OF THE INVENTION

The present invention relates to a method and apparatus for maintaining an optimum bias point of a signal modulator.

In order to minimize non-linear characteristics of a signal modulator, digital samples of a harmonic signal are averaged to produce a value of which the magnitude is minimized. A pilot signal is generated and injected into the input of the signal modulator. Due to the non-linear characteristics of the signal modulator, the harmonic signal is produced at the output of the signal modulator. Digital samples are taken of the harmonic signal in the time domain at trigger times based on the value of the pilot signal.

BRIEF DESCRIPTION OF THE DRAWINGS

The present invention will be better understood from the following detailed description of a preferred embodiment of the invention, taken in conjunction with the accompanying drawings in which like reference numerals refer to parts and in which.

DESCRIPTION OF THE PREFERRED EMBODIMENT

Figure 1:
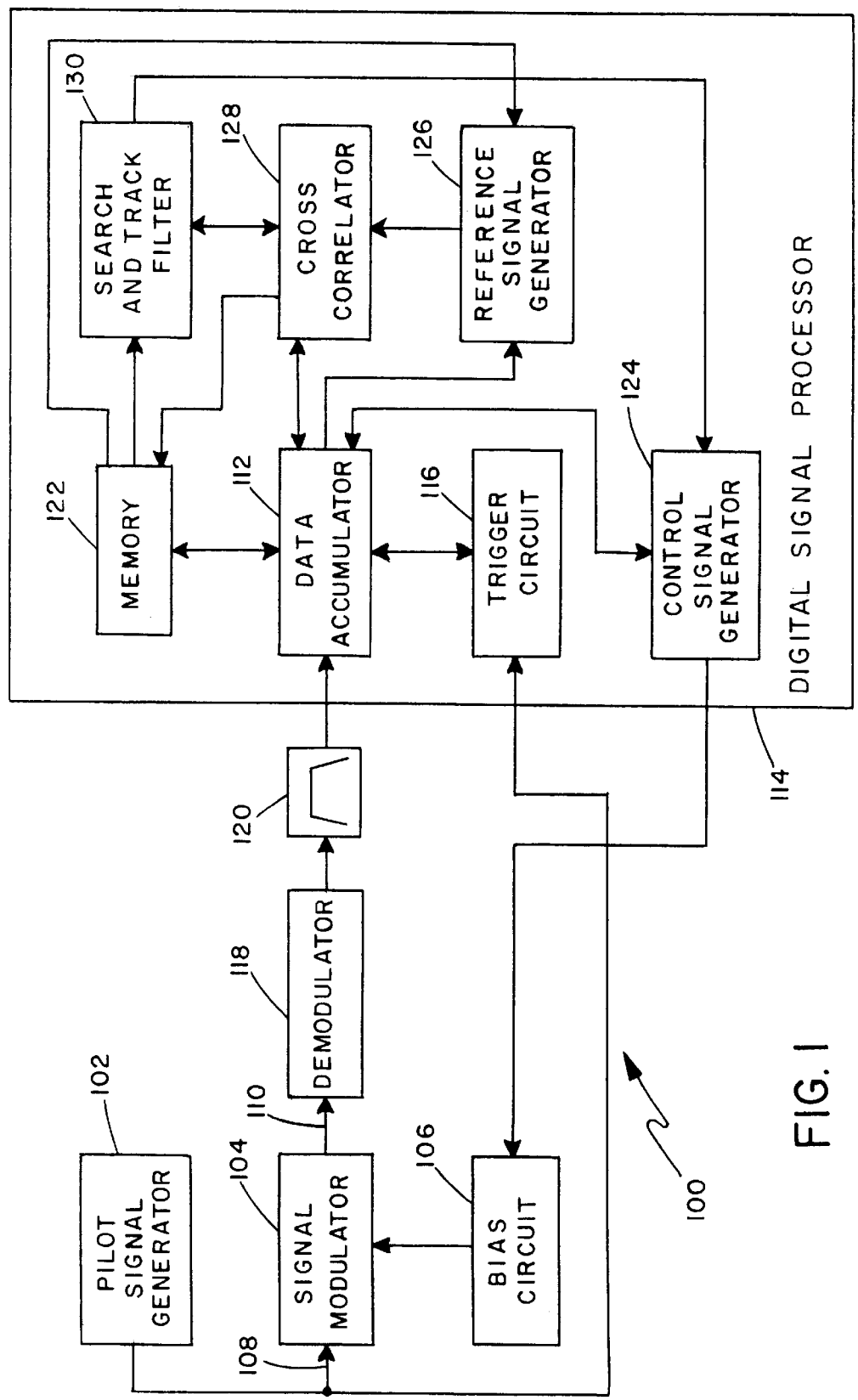
FIG. 1 is a block diagram of a transmitter in accordance with a preferred embodiment of the present invention.

FIG. 1 is block diagram of a transmitter 100 in accordance with a preferred embodiment of the present invention. A bias circuit 106 supplies a bias voltage to a signal modulator 104 in order to maintain a desirable mode of operation of the signal modulator 104. In the preferred embodiment, the signal modulator 104 is an electro-optic signal modulator utilizing a lithium niobate (LiNbO$_3$) crystal. However, the present invention applies to other types of signal modulators that require a particular bias point to operate in a linear or near linear mode such as radio frequency (RF) modulators and mixers. As discussed above, lithium niobate crystals utilize metal electrodes placed above and below an optical wave guide. A desired signal is coupled onto the electrodes changing the optical index of refraction of the crystal. Light from a continuous wave (CW) source laser is modulated by the desired signal as it passes through the crystal. Optimum operation of the crystal requires that the signal modulator 104 (metal electrodes) be biased at a point of inflection of the signal modulator's 104 transfer function. This optimum bias point is typically referred to as the quadrature bias point.

The bias circuit 106 is, preferably, constructed using a 20 bit digital to analog converter (DAC) to provide a D.C. bias voltage. The bias circuit 106 has an input for receiving a control signal. Preferably, the control signal is in the form of a digital word and contains information on the value of the bias voltage. The DAC produces an analog bias voltage in accordance with the control signal.

A pilot signal generator 102 generates a pilot signal that is injected into the input 108 of the signal modulator 104. Preferably, the pilot signal generator 102 is a constructed using a TTL (Transistor Transistor Logic) clock oscillator of which the output is filtered in order to produce a near sinusoidal signal. In the preferred embodiment, the pilot signal is a 5.028 MHz sinusoidal signal.

The non-linear transfer function of the signal modulator 104 produces harmonic signals of the pilot signal at the output 110 of the signal modulator 104. Therefore, a modulated light signal produced at the output 110 of the signal modulator 104 includes the pilot signal at 5.028 MHz, a second order signal (first harmonic) at 10.056 MHz, a third order signal (second harmonic) at 15.084 MHz and other harmonic signals.

A demodulator (receiver) 118 demodulates a portion of the modulated light signal produced at the output 110 of the signal modulator 104. The other portion of the modulated light signal is transmitted through the communication system. The demodulator 118 is constructed using known techniques and includes a photo detector and other components needed to produce a baseband radio frequency representation of the harmonic signal.

The harmonic signal is filtered in a band pass filter 120 having a frequency bandwidth determined by the frequency difference between the pilot signal and the sampling frequency as discussed below. In the preferred embodiment, the band pass filter 120 has a 3 dB bandwidth of 400 KHz and a center frequency of 10.056 MHz.

The data accumulator 112 is, preferably, implemented within a digital signal processor 114 such as a TMS 320C31 processor commercially available from the Texas Instruments Company. However, the data accumulator 112 may be designed to utilize bit slice techniques or may be constructed using Field Programmable Gate Arrays (FPGAs), microprocessors, or Application Specific Integrated Circuits (ASICs).

The data accumulator 112 digitally samples a harmonic of the pilot signal in the time domain to produce a plurality of digital samples. The sampling rate of the data accumulator 112 depends on the bandwidth of the harmonic signal and, in the preferred embodiment, is at least 20 times the bandwidth of the band pass filter 120. Preferably, the data accumulator 112 samples the second order signal at a rate of 5 MHz.

As is apparent to those skilled in the art, when an analog signal is sampled by an analog to digital converter having a sampling rate of half the frequency of the sampled signal, the digital data is constrained within half the sample frequency. This aliasing result is utilized to down convert the 10.056 MHz signal to a 56 KHz digitally represented sinusoidal signal. Therefore, the bandwidth of the resulting digital signal is determined by the frequency of the pilot signal and the sampling frequency.

In the preferred embodiment, the data accumulator 112 acquires approximately 4000 digital samples to form a sample set. The data accumulator 112 begins sampling at a trigger time communicated by a trigger signal from a trigger circuit 116 discussed below. The number of digital samples within a sample set is determined by the speed and memory of the data accumulator 112. By grouping the samples into sample sets, continuous sampling of the harmonic signal is avoided and a less powerful digital signal processor may be utilized than if continuous sampling is required. The number of digital samples within a sample set depends on the particular transmitter 100 and typically depends on the speed and memory of the digital signal processor 114, the bandwidth of the second order signal and the gain requirements of the transmitter.

The data accumulator 112 divides the sum of the digital samples within a sample set by the number of digital samples within the set to produce an average value for each sample set. The average value for each sample set and the corresponding digital word representing the bias voltage is stored in the digital signal processor memory 122. Therefore, a histogram can be created including information on the magnitude of the harmonic signal and the corresponding bias voltage.

A control signal generator 124 produces a control voltage based on the average harmonic signal value in order to minimize the magnitude of the average harmonic signal value. Using the information stored in memory, the data accumulator 112 forwards the average harmonic signal value and previous harmonic signal values with corresponding bias voltage values to the control signal generator 124 which determines the control signal needed to reduce the magnitude of the average harmonic signal value. Based on the control signal, the bias circuit 106 adjusts the bias voltage in order to minimize the magnitude of the average harmonic signal value. The control signal indicates to the bias circuit 106 a new bias voltage value or, alternatively, the direction (higher or lower) and the magnitude that the bias voltage should be changed. If the average harmonic signal value is equal to zero, the control signal indicates that no bias voltage change is necessary.

Therefore, the bias voltage is adjusted in accordance with previous average harmonic signal values, corresponding bias voltages, and the average harmonic signal value.

A trigger circuit 116, preferably implemented within the digital signal processor 114, provides the trigger signal to the data accumulator 112 based on the pilot signal and the operation mode of the data accumulator 112. A predetermined value of the pilot signal is chosen as a triggering value. When the magnitude of the pilot signal equals the predetermined value, the trigger circuit 116 establishes a reference for triggering the data accumulator 112.

However, in the preferred embodiment, the trigger circuit 116 does not send a trigger to the data accumulator 112 until the trigger circuit 116 receives a signal indicating that the data accumulator 112 is prepared to sample. The data accumulator 112 indicates to the trigger circuit 116 when all of the digital samples within a sample set are taken and it is prepared to begin sampling for another sample set. The trigger circuit 116 supplies a trigger signal based on pilot signal when the data accumulator 112 is ready to begin taking samples for a sample set.

Figure 2:
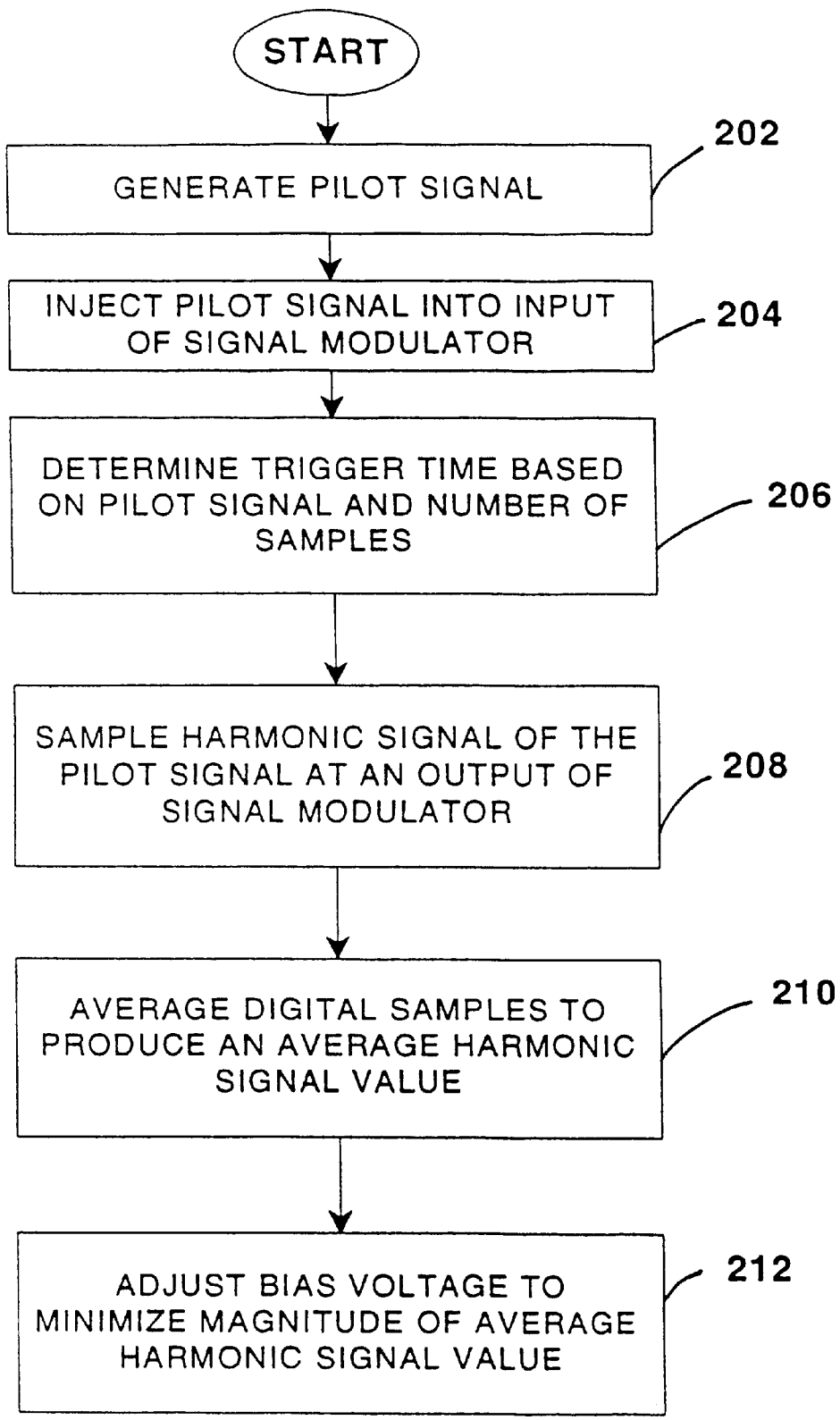
FIG. 2 is a flow chart of a method of increasing a signal to noise ratio of a desired signal produced by the signal modulator 104 in accordance with the preferred embodiment of the present invention.

FIG. 2 is a flow chart of a method of increasing a signal to noise ratio of a desired signal produced by the signal modulator 104 in accordance with the preferred embodiment of the present invention. At step 202, a pilot signal is generated by a pilot signal generator 102. As discussed above, the pilot signal may be generated using any one various known techniques including generating a pilot signal using a crystal oscillator.

The pilot signal is injected into the input of the signal modulator 104 at step 204.

At step 206, the trigger time is determined by a trigger circuit 116 using the pilot signal and information on the quantity of samples taken by the data accumulator 112. As explained above, the trigger circuit 116 sets a reference based on a predetermined value of the pilot signal. When the pilot signal amplitude equals the predetermined value and the data accumulator 112 is prepared to begin sampling, a trigger signal is sent to the data accumulator 112.

At step 208, the data accumulator 112 samples the harmonic signal produced at the output of the signal modulator 104 by the non-linear characteristics of the signal modulator 104. In the preferred embodiment, the second order signal (first harmonic) is sampled by the data accumulator 112 at the trigger time to produce a plurality of digital samples. The digital samples are taken in groups of sample sets. The number of digital samples within a sample set depends on the particular transmitter 100 and typically depends on the speed and memory of the digital signal processor 114, the bandwidth of the second order signal and the gain requirements of the transmitter.

At step 210, the digital samples are averaged by adding the values of the digital samples and dividing by the number of samples to produce an average harmonic signal value. The control signal generator 124 produces a control signal based on the average harmonic signal value and sends a digital word to the bias circuit 106.

At step 212, bias voltage (at which the signal modulator 104 is biased) is adjusted to minimize the magnitude of the average harmonic signal value. Preferably, a bias circuit 106 uses the control signal from the data accumulator 112 to determine the new bias voltage.

Therefore, the signal to noise ratio of the desired signal produced by the signal modulator 104 is increased by adjusting the bias voltage to be closer to the quadrature bias point of the signal modulator 104. Digital samples are coherently taken of the second order signal to produce digital signals that are averaged. The bias voltage is adjusted to minimize the magnitude of the average harmonic signal value of the digital samples.

In the preferred embodiment, the performance of the signal modulator is further improved by adjusting the bias voltage based on a cross-correlation signal produced by cross-correlating the harmonic signal with the pilot signal.

Referring again to FIG. 1, the frequency of a reference signal is determined by sampling the output 110 of the signal modulator 104 when a strong harmonic signal is present. The data accumulator 112 digitally samples the harmonic signal at a time when the signal to noise ratio of the harmonic signal is relatively high (i.e. easily detectable) to determine the frequency of the harmonic signal. The frequency (or period) of the harmonic signal is stored in memory 122.

A reference signal generator 126 uses the stored frequency value and phase information derived from the pilot signal to generate a reference signal. Therefore, the reference signal has a frequency derived from the harmonic signal and a phase based on the pilot signal. It is noted that it is not necessary for the reference signal to be "in phase" with the pilot signal.

Rather, the pilot signal is used to maintain a constant relative phase of the reference signal to the pilot signal.

The phase information from the pilot signal may be derived from a variety of sources such as from the trigger circuit 116, the data accumulator 112 or directly from the pilot signal. The reference signal generator 126 is constructed using known techniques and is preferably implemented within the digital signal processor 114.

A cross-correlator 128 cross-correlates the reference signal with the digital representation of the harmonic signal produced by the data accumulator 112. In the preferred embodiment, the digital representation of the harmonic signal is an under sampled, aliased signal (also referred to as the digital sample signal) and has a frequency of 56 kHz. The reference signal also has a frequency of 56 KHz in the preferred embodiment. In other words, in the preferred embodiment the cross-correlator 128 cross-correlates the pilot signal with the harmonic signal by cross-correlating a digital sample signal derived from the harmonic signal and a reference signal generated using the pilot signal and previously obtained frequency information. By cross-correlating the reference signal with the digital sample signal, the cross-correlator 128 produces a correlation signal.

Figure 3:
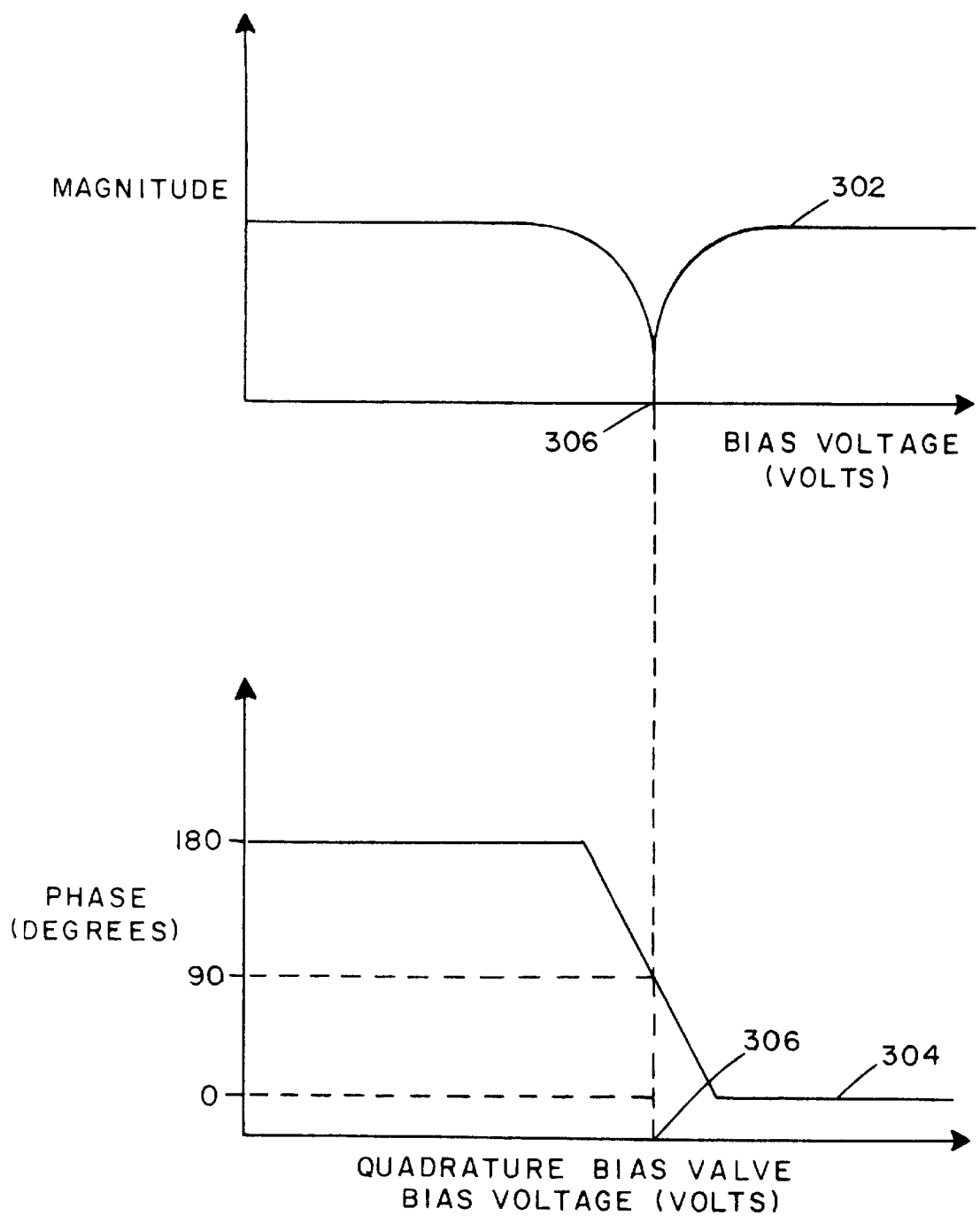
FIG. 3 is a graphical representation of the phase and magnitude of the cross-correlation signal in accordance with the present invention.

Referring now to FIG. 3, FIG. 3 is a graphical representation of signal magnitude 302 and signal phase 304 of the cross-correlation signal. As can be seen from FIG. 3, the magnitude 302 of the cross-correlation signal significantly decreases at the optimum bias voltage (quadrature bias value) 306. When the signal modulator 104 is biased at the optimum bias voltage 306, the signal modulator is operating in a linear mode of operation. As the bias voltage approaches the optimum bias voltage, non-linear characteristics of the signal modulator 104 are reduced and as a result the harmonic signal decreases in magnitude. As can be seen in FIG. 3, the magnitude 302 of the cross-correlation signal reflects the linear operation with a zero (or near zero) value. The low amplitude of the harmonic signal at this point results in a low correlation between the reference signal and the digital sample signal since the digital sample signal at this point is essentially a random noise signal.

As the bias voltage approaches the optimum bias point 306, the phase 304 of the correlation signal begins to change by 180 degrees. At the optimum bias voltage 306, the phase 304 is equal to 90 degrees.

It should be noted that the graphical representations in FIG. 3 are exaggerated to show the phase 304 and magnitude 302 changes at the optimum bias voltage. These changes occur within a very small range in bias voltage. In the preferred embodiment, where a lithium niobate crystal is used, the change in bias voltage from 180 degrees phase to 0 degrees phase is on the order of several millivolts.

Referring again to FIG. 1, the cross-correlator 128 produces a phase value and a power value of the cross-correlation signal for a plurality of bias voltage values and, therefore, producing a plurality of power values and plurality of phase values associated with the plurality of bias voltage values. The plurality of phase values and the plurality of power values are stored in memory 122 with the corresponding bias voltage values. Therefore, the memory 122 contains information showing the relationship between bias voltage and the phase and power of the harmonic signal.

A search and track filter 130, using the stored phase and power information and the phase and power values currently received, determines an optimum bias voltage to reduce the non-linear characteristics of the signal modulator. The search and track filter 130 determines the direction in which the bias voltage should be changed in order to reduce the difference between the phase value and the optimum phase value. As discussed above, the optimum phase value in the preferred embodiment is 90 degrees. Using the stored power information, the search and track filter 130 determines the magnitude of the change needed to bias the signal modulator 104 at the optimum bias voltage. Therefore, the search and track filter 130 determines the optimum bias voltage based on the plurality of phase values associated with the plurality of bias voltage values, the plurality of power values associated with the plurality of bias voltage values and the power and phase values of the cross-correlation signal.

The control signal generator 124 generates a control signal in the form of a digital word corresponding to the optimum bias voltage determined by the search and track filter 130. The control signal is sent to the bias circuit 106. As discussed above, the bias circuit is preferably a 20 bit DAC. Based on the control signal the bias circuit produces an analog bias voltage to bias the signal modulator 104.

Figure 4:
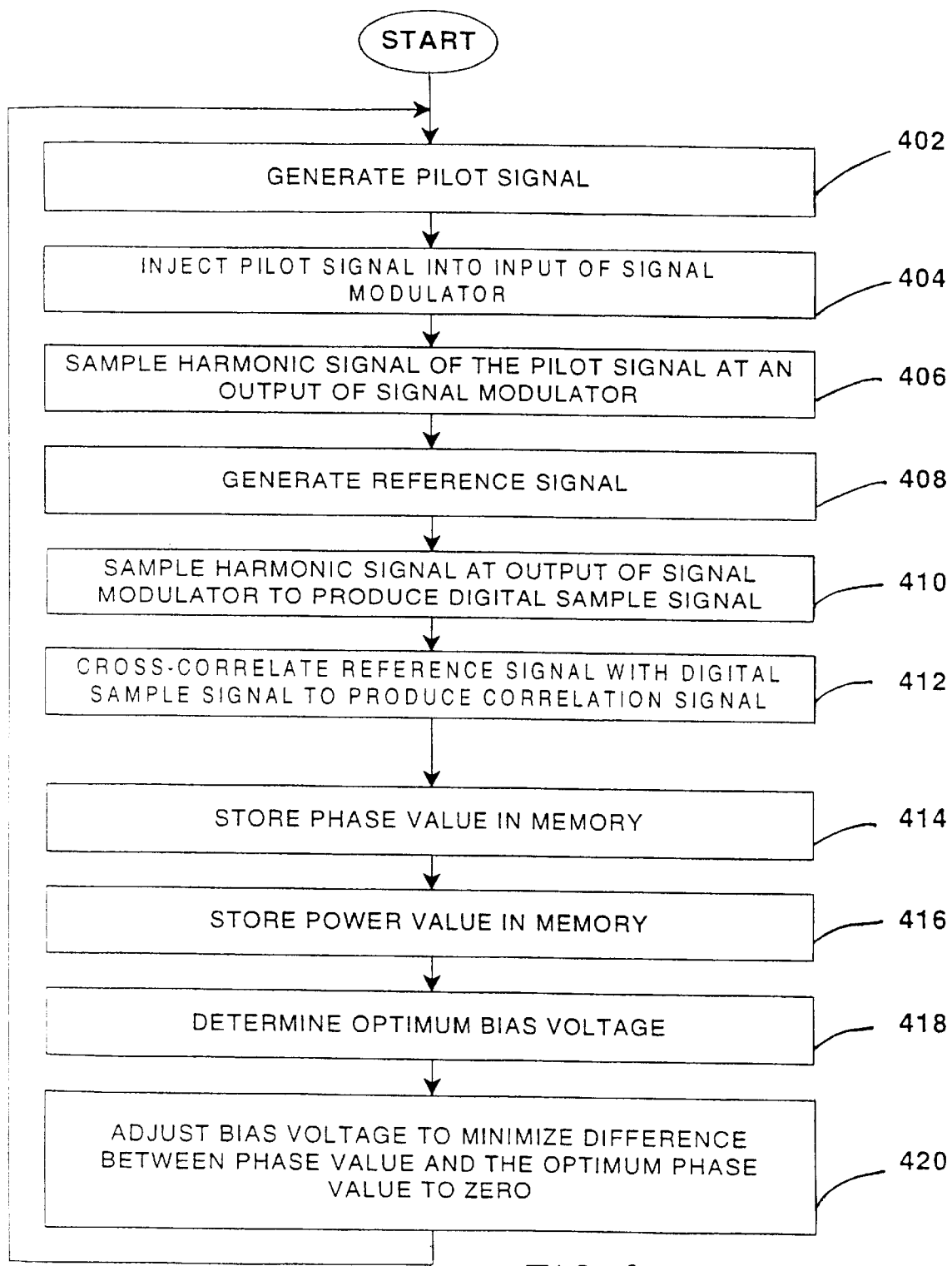
FIG. 4 is flow chart of a method of optimizing linear operation of the signal modulator in accordance with the preferred embodiment of the present invention.

FIG. 4 is flow chart of a method of optimizing the operation of the signal modulator 104 in accordance with the preferred embodiment of the present invention. At step 402, a pilot signal is generated by the pilot signal generator 102 which is injected into the input 108 of the signal modulator 104 and step 404.

At step 406, the harmonic signal of the pilot signal is sampled at the output of the 110 of the signal modulator 104. As described above, in the preferred embodiment, the harmonic signal is sampled at a frequency less than the frequency of the harmonic signal resulting in an aliased signal having a bandwidth of 56 KHz. The frequency of this signal is measured and stored in memory 122. In order to obtain an accurate measurement of the frequency of the harmonic signal, the harmonic signal is sampled when the signal to noise ratio of the harmonic signal is relatively high (typically during non-linear operation of the signal modulator 104).

At step 408, the reference signal is generated using the stored frequency value and the phase of the pilot signal. The reference signal is a digital signal and has frequency of 56 kHz.

The harmonic signal is sampled at the output 110 of the signal modulator to produce a digital sample signal at step 410. The digital sample signal has a frequency equal to the reference signal.

At step 412, the reference signal is cross-correlated with the digital signal to produce a cross-correlation signal having a phase value and a power value which is determined by the cross-correlator 128.

At step 414, the phase value is stored in memory 122 with a plurality of phase values being stored in memory 122 by repeating steps 402 through 412 for different bias voltage values. Preferably, the plurality of phase values are obtained during optimization of the signal modulator 104 performance during execution of steps 402 through 420.

At step 416, the power value is stored in memory 122 with a plurality of power values being stored in memory 122 by repeating steps 402 through 412 for different bias voltage values. Preferably, the plurality of power values are obtained during optimization of the signal modulator 104 performance during execution of steps 402 through 420.

At step 418, the optimum bias voltage is determined using the plurality of phase values, the plurality of power values, phase value and the power value. As discussed above, the search and track filter 130 determines the direction the bias voltage should be changed in order to reduce the difference between the phase value and the optimum phase value. Using the stored power information, the search and track filter 130 determines the necessary change in magnitude of the bias voltage.

At step 420, the bias voltage is adjusted to the optimum bias voltage. As discussed above, the control signal generator 124 sends a control signal to the bias circuit 106. The bias circuit produces and analog bias voltage based on the control signal.

Therefore, in the preferred embodiment, the signal to noise ratio of a desired signal produced by the signal modulator 104 is increased by sampling the harmonic signal of a pilot signal and adjusting the bias voltage to minimize the magnitude of the average harmonic signal value. A digital sample signal produced by sampling the harmonic signal is cross-correlated with a reference signal having the same frequency and phase based on the pilot signal. The difference between the phase of the resulting cross-correlation signal and an optimum phase value is minimized to further optimize the performance of the signal modulator 104.

The method of reducing the non-linear characteristics allows for the signal modulator to operate in an improved linear mode where analog techniques can not detect the harmonic signal. The bias voltage can be adjusted to optimize performance where the harmonic signal is below the noise floor.

The previous descriptions of the preferred embodiment are provided to enable any person skilled in the art to use the present invention. Various modifications to these embodiments will be readily apparent to those skilled in the art, and the generic principles defined herein may be applied to other embodiments without the use of the inventive facility. Therefore, this invention is to be limited only by the following claims, which include all such other embodiments and modifications when viewed in conjunction with the above specification and accompanying drawings.

We claim:

1. A method of maintaining linear operation of a signal modulator, the method comprising the steps of:

sampling a harmonic signal of a pilot signal to produce a plurality of digital samples in a time domain, the harmonic signal resulting from a non-linear transfer function of the signal modulator;

averaging the plurality of digital samples to produce an average harmonic signal value; and adjusting a bias voltage of the signal modulator to reduce a magnitude of the harmonic signal value.

2. A method in accordance with claim 1 wherein the step of sampling comprises sampling a second order harmonic signal of the pilot signal.

3. A method in accordance to with claim 1, wherein the step of adjusting comprises adjusting a bias voltage of a lithium niobate (LiNbO$_3$) crystal of an electro-optic signal modulator.

4. A method in accordance with claim 1, further comprising the step of determining, based on the pilot signal, a trigger time to begin the step of sampling.

5. A method in accordance with claim 4, wherein the step of determining the trigger time comprises the step of determining the trigger time based on a quantity of the plurality of digital samples.

6. A method in accordance with claim 5 further comprising the step of repeating the steps of determining the trigger time and sampling to produce a number of sample sets of the plurality of digital samples.

7. A method of maintaining linear operation of an electro-optic signal modulator, the method comprising the steps of:
   determining a trigger time based on a pilot signal;
   sampling, at the trigger time, a second order signal of the pilot signal to produce a plurality of digital samples in a time domain, the second order signal resulting from a non-linear transfer function of the electro-optic signal modulator;
   averaging the plurality of samples to produce an average harmonic signal value; and
   adjusting a bias voltage of the electro-optic signal modulator to reduce a magnitude of the harmonic signal value.

8. A method in accordance to with claim 7, wherein the step of adjusting comprises adjusting a bias voltage of a lithium niobate (LiNbO$_3$) crystal of the electro-optic signal modulator.

9. A method in accordance with claim 8, wherein the step of determining the trigger time comprises the step of determining the trigger time based on a quantity of the plurality of digital samples.

10. A method in accordance with claim 9 further comprising the step of repeating the steps of determining the trigger time and sampling to produce a number of sample sets of the plurality of digital samples.

11. A transmitter comprising:
   a signal modulator adapted to receiving a pilot signal at an input of the signal modulator and having a non-linear transfer function between the output of the signal modulator and an input of the signal modulator to produce a harmonic signal at the output of the signal modulator;
   a digital signal processor adapted to produce a control signal based on an average of a plurality of digital samples in a time domain of the harmonic signal; and
   a bias circuit adapted to supplying a bias voltage to the signal modulator, the bias circuit responsive to the control signal by adjusting the bias voltage to reduce a magnitude of the average of the digital samples.

12. A transmitter in accordance with claim 11 further comprising a trigger circuit adapted to supplying a trigger signal to the digital signal processor based on the pilot signal, the digital signal processor responsive to the trigger signal by digitally sampling, in the time domain, the harmonic signal based on the trigger signal to produce the plurality of digital samples.

13. A transmitter in accordance with claim 11, wherein the trigger circuit is adapted to supplying the trigger signal based on a quantity of the plurality of digital samples.

14. A transmitter in accordance with claim 11, wherein the harmonic signal is a second order signal.

15. A transmitted in accordance with claim 11, the signal modulator comprising a lithium niobate (LiNbO$_3$) crystal.

16. A transmitter comprising:
   an electro-optic signal modulator adapted to receiving a pilot signal at an input of the electro-optic signal modulator and having a non-linear transfer function between the output of the output signal modulator and an input of the electro-optic signal modulator to produce a second order signal at the output of the electro-optic signal modulator;
   a digital signal processor adapted to sampling the second order signal in a time domain at a trigger time based on a trigger signal to produce a plurality of digital samples arranged into a number of sample sets and adapted to produce a control signal based on an average of the plurality of digital samples;
   a trigger circuit adapted to supplying a trigger signal to the digital signal processor based on the pilot signal, a quantity of digital samples and the number of the sample sets; and
   a bias circuit adapted to supplying a bias voltage to the electro-optic signal modulator, the bias circuit responsive to the control signal by adjusting the bias voltage to reduce a magnitude of the average of the digital samples.

17. A transmitted in accordance with claim 16, the signal modulator comprising a lithium niobate (LiNbO$_3$) crystal.

18. A signal processor adapted to performing the steps of:
   sampling a harmonic signal of a pilot signal to produce a plurality of digital samples in a time domain, the harmonic signal resulting from a non-linear transfer function of a signal modulator;
   averaging the plurality of samples to produce an average harmonic signal value; and
   adjusting a bias voltage of the signal modulator to reduce a magnitude of the harmonic signal value.

19. A signal processor in accordance with claim 18 further wherein the step of sampling comprises sampling a second order harmonic signal of the pilot signal.

20. A signal processor in accordance with claim 18, wherein the step of adjusting comprises adjusting a bias voltage of a lithium niobate (LiNbO$_3$) crystal of an electro-optic signal modulator.

21. A signal processor in accordance with claim 18, further adapted to performing the step of determining, based on the pilot signal, a trigger time to begin the step of sampling.

22. A signal processor in accordance with claim 21, wherein the step of determining the trigger time comprises the step of determining the trigger time based on a quantity of the plurality of digital samples.

23. A signal processor in accordance with claim 22 further adapted to perform the step of repeating the steps of determining the trigger time and sampling to produce a number of sample sets of the plurality of digital samples.

24. An apparatus for reducing non-linear characteristics of a signal modulator, the apparatus comprising:
   a digital sampler adapted to sampling a harmonic signal of a pilot signal to produce a plurality of digital samples in a time domain, the harmonic signal resulting from a non-linear transfer function of the signal modulator;
   a data accumulator adapted to averaging the plurality of digital samples to produce an average harmonic signal value; and
   a bias circuit adapted to supplying a bias voltage to the signal modulator and responsive to the average harmonic signal value by adjusting the bias voltage to reduce a magnitude of the average harmonic signal value.

25. An apparatus in accordance with claim 24, the digital sampler further adapted to sampling the harmonic signal at a plurality of trigger times based on the pilot signal.

26. An apparatus in accordance with claim 25, the digital sampler further adapted to sampling the harmonic signal to produce a plurality of sample sets of the plurality of digital samples based on a quantity of digital samples.

* * * * *